(12) United States Patent
Choi et al.

(10) Patent No.: US 11,105,700 B2
(45) Date of Patent: Aug. 31, 2021

(54) SNUBBER FOR PRESSURE SENSOR AND PRESSURE SENSOR COMPRISING THE SAME

(71) Applicant: Tyco Electronics AMP Korea Co., Ltd., Gyungsan-si (KR)

(72) Inventors: Won Jong Choi, Gyungsan-si (KR); Sun Yong Lee, Gyungsan-si (KR)

(73) Assignee: Tyco Electronics AMP Korea Co., Ltd., Gyungsan-si (KR)

( * ) Notice: Subject to any disclaimer, the term of this patent is extended or adjusted under 35 U.S.C. 154(b) by 173 days.

(21) Appl. No.: 16/412,948

(22) Filed: May 15, 2019

(65) Prior Publication Data

US 2019/0353549 A1     Nov. 21, 2019

(30) Foreign Application Priority Data

May 15, 2018  (KR) .......................... 10-2018-0055594
Apr. 3, 2019   (KR) .......................... 10-2019-0039172

(51) Int. Cl.
*G01L 19/14*     (2006.01)
*G01L 19/00*     (2006.01)

(52) U.S. Cl.
CPC ........ *G01L 19/147* (2013.01); *G01L 19/0038* (2013.01); *G01L 19/0069* (2013.01); *G01L 19/0084* (2013.01); *G01L 19/143* (2013.01); *G01L 19/148* (2013.01)

(58) Field of Classification Search
CPC .............. G01L 19/147; G01L 19/0038; G01L 19/0069; G01L 19/0084; G01L 19/143; G01L 19/148
See application file for complete search history.

(56) References Cited

U.S. PATENT DOCUMENTS

| 4,168,630 | A | 9/1979 | Shirouzu et al. |
| 5,792,958 | A * | 8/1998 | Speldrich ................ G01L 19/06 338/42 |
| 8,453,513 | B2 * | 6/2013 | Bigliati ................ G01L 19/147 73/756 |
| 9,945,747 | B1 * | 4/2018 | Kusanale ............ G01L 19/0627 |
| 10,845,264 | B2 * | 11/2020 | Kim ...................... G01L 19/144 |
| 2017/0089792 | A1 * | 3/2017 | Russell ............... G01L 19/0038 |
| 2018/0106694 | A1 * | 4/2018 | Kusanale .................. G01L 7/08 |

* cited by examiner

*Primary Examiner* — Jamel E Williams
(74) *Attorney, Agent, or Firm* — Barley Snyder (57) ABSTRACT

A pressure sensor comprises a sensor housing, a diaphragm provided in the sensor housing, and a snubber insertable into the sensor housing. The sensor housing includes a coupler coupling with a pressure measurement target and a housing passage passing through the coupler and guiding a fluid that flows into the sensor housing from the pressure measurement target. The diaphragm is deformable by a pressure of the fluid that flows into the sensor housing from the pressure measurement target. The snubber is inserted into the sensor housing through the housing passage and fastens to the sensor housing in a state in which at least a portion of the sensor housing forming the housing passage is deformed. The snubber guides flow of the fluid and transmits the pressure of the fluid to the diaphragm.

15 Claims, 9 Drawing Sheets

SNUBBER FOR PRESSURE SENSOR AND PRESSURE SENSOR COMPRISING THE SAME

CROSS-REFERENCE TO RELATED APPLICATIONS

This application claims the benefit of the filing date under 35 U.S.C. § 119(a)-(d) of Korean Patent Application No. 10-2018-0055594, filed on May 15, 2018, and Korean Patent Application No. 10-2019-0039172, filed on Apr. 3, 2019.

FIELD OF THE INVENTION

The present invention relates to a snubber and, more particularly, to a snubber for a pressure sensor.

BACKGROUND

A sensor refers to a part, an instrument, or a measuring device that detects or classifies and measures a physical amount or change of, for example, heat, light, temperature, pressure, and sound, and informs a corresponding result using a desired signal. Alternatively, the sensor refers to a device or a part that detects senses of a human such as visual and auditory elements. A pressure sensor may detect pressure and may include various parts.

SUMMARY

A pressure sensor comprises a sensor housing, a diaphragm provided in the sensor housing, and a snubber insertable into the sensor housing. The sensor housing includes a coupler coupling with a pressure measurement target and a housing passage passing through the coupler and guiding a fluid that flows into the sensor housing from the pressure measurement target. The diaphragm is deformable by a pressure of the fluid that flows into the sensor housing from the pressure measurement target. The snubber is inserted into the sensor housing through the housing passage and fastens to the sensor housing in a state in which at least a portion of the sensor housing forming the housing passage is deformed. The snubber guides flow of the fluid and transmits the pressure of the fluid to the diaphragm.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to like elements. In the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, a description made in one example embodiment may be applicable to another example embodiment and a detailed description within a duplicate range is omitted. In the drawings, x, y, and z axes represent mutually orthogonal 3-axial directions. In detail, the x axis and the y axis represent a horizontal direction and the z axis represents a height direction.

In an embodiment, a pressure sensor 1 couples with a pressure measurement target, measures pressure of a fluid that flows from the pressure measurement target, and transmits the measured pressure to an outside. The pressure sensor 1 may include various parts to measure internal pressure. The pressure sensor 1 may employ a structure capable of reducing an area of an internal flow path to prevent the flow of the fluid flowing from the pressure measurement target from damaging a part. The fluid may flow into the pressure sensor 1 only through a narrow passage, which may lead to gradually increasing the internal pressure of the pressure sensor 1.

Figure 1:
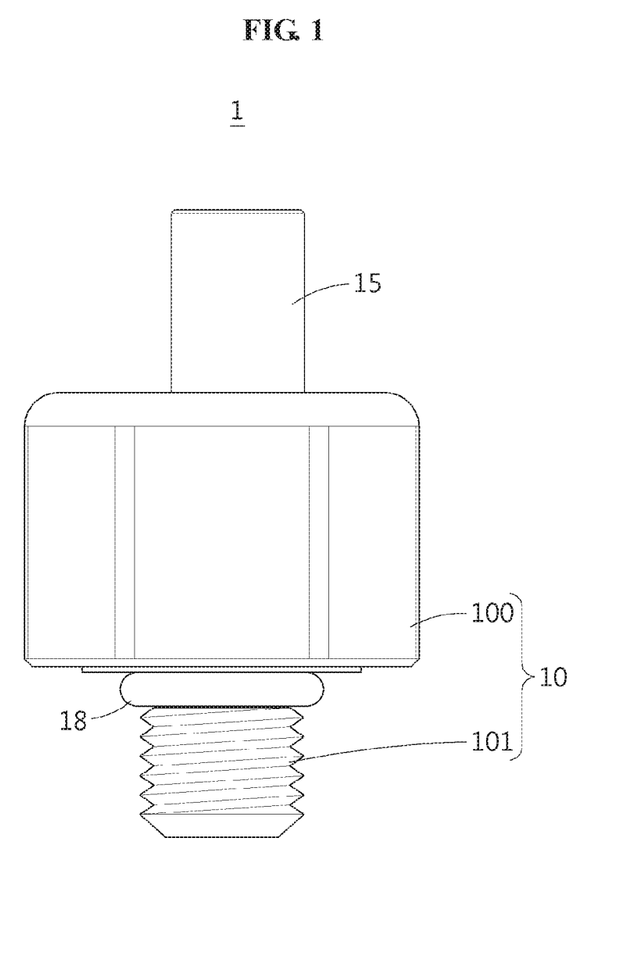
FIG. 1 is a perspective view of a pressure sensor according to an embodiment.
Figure 2:
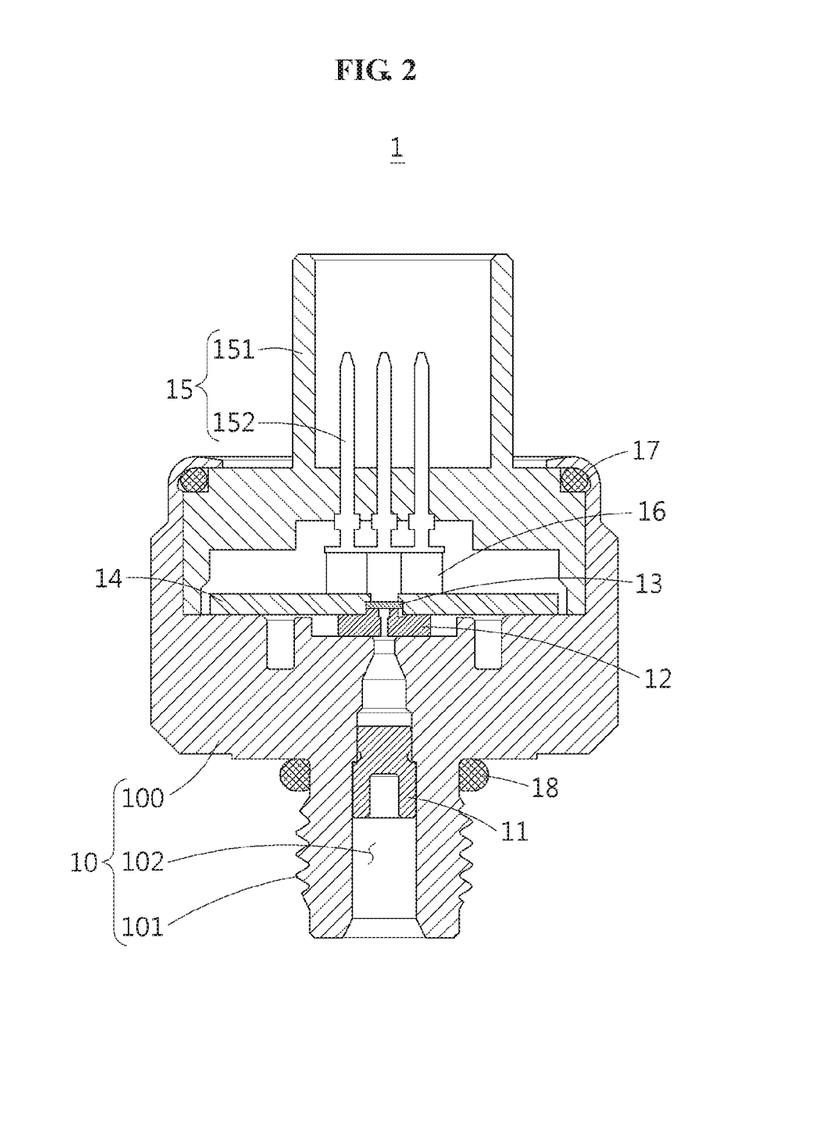
FIG. 2 is a sectional side view of the pressure sensor.

A pressure sensor 1 according to an embodiment is shown in FIGS. 1 and 2. The pressure sensor 1 comprises a sensor housing 10, a snubber 11, a support 12, a diaphragm 13, a circuit board 14, a connector 15, a connecting terminal 16, an inner O-ring 17, and an outer O-ring 18.

The sensor housing 10, as shown in FIGS. 1 and 2, includes a housing body 100, a coupler 101 configured to protrude from the housing body 100 and to couple with the pressure measurement target, and a housing passage 102 configured to pass through the coupler 101 and to guide the fluid that flows into the sensor housing 10 from the pressure measurement target. The coupler 101 may couple with the pressure measurement target using, for example, a screw connection. The screw connection is merely exemplary, however, and in other embodiments the coupler 101 may couple with the pressure measurement target with other forms of connection. The housing passage 102 may be in, for example, a cylindrical shape. In other embodiments, the housing passage 102 may have other shapes.

Figure 6:
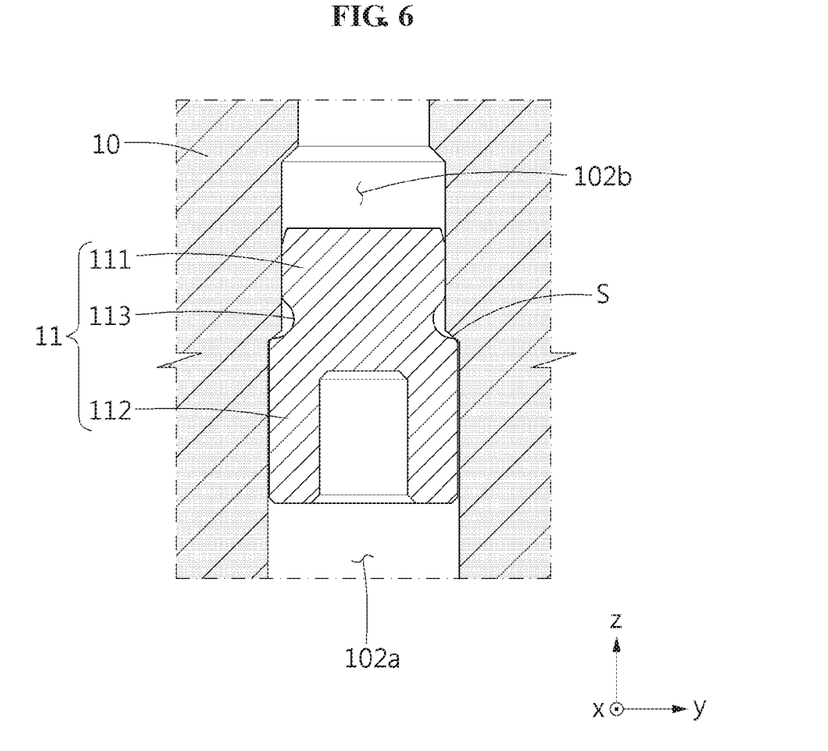
FIG. 6 is a sectional side view of the pressure sensor with the snubber inserted into a sensor housing in an initial state.

The housing passage 102, as shown in FIG. 6, includes an outer passage 102a provided to be close at an end of the coupler 101 and an inner passage 102b configured to extend upward from the outer passage 102a. In an embodiment, a diameter of the outer passage 102a may be greater than a diameter of the inner passage 102b. In this case, in the sensor housing 10, a portion corresponding to the inner passage 102b protrudes toward a central shaft compared to a portion corresponding to the outer passage 102a and a step S may be formed in a contact portion between the outer passage 102a and the inner passage 102b.

The snubber 11, as shown in FIG. 2, may be inserted into the sensor housing 10 through the housing passage 102, may fasten to the sensor housing 10 in a state in which at least a portion of the sensor housing 10 forming the housing passage 102 is deformed, and may guide flow of the fluid such that pressure of the fluid may be transmitted to the diaphragm 13. The snubber 11 may reduce an area of the housing passage 102. The snubber 11 may be introduced toward an opening of the housing passage 102 and may insert into the sensor housing 10 through the housing passage 102. The opening of the housing passage 102 refers to a portion that is formed at the end of the coupler 101 and through which the fluid inserts into the pressure sensor 1 from the pressure measurement target. The snubber 11 may prevent a large amount of fluid from flowing into the pressure sensor 1 from the pressure measurement target at a time.

The snubber 11 is an object separate from the sensor housing 10 and the diaphragm 13, as shown in FIG. 2. In an embodiment, the snubber 11 may fasten to the sensor housing 10 using a press-in scheme before the diaphragm 13 is safely received in the sensor housing 10. Through this assembly, it is possible to prevent mechanical stress occurring during an assembly process of the snubber 11 from affecting the diaphragm 13. In the meantime, since the snubber 11 is separate from the diaphragm 13, the mechanical stress applied to the diaphragm 13 may be not directly but indirectly transmitted through the sensor housing 10 if the snubber 11 is inserted into the sensor housing 10 using a press-in scheme in a state in which the diaphragm 13 is received in the sensor housing 10. Accordingly, magnitude of the stress may be small.

As shown in FIG. 2, the support 12 may support the diaphragm 13 provided in the sensor housing 10. The support 12 may be provided as an object separate from the sensor housing 10. In an embodiment, the support 12 and the sensor housing 10 may be integrally formed.

Figure 3:
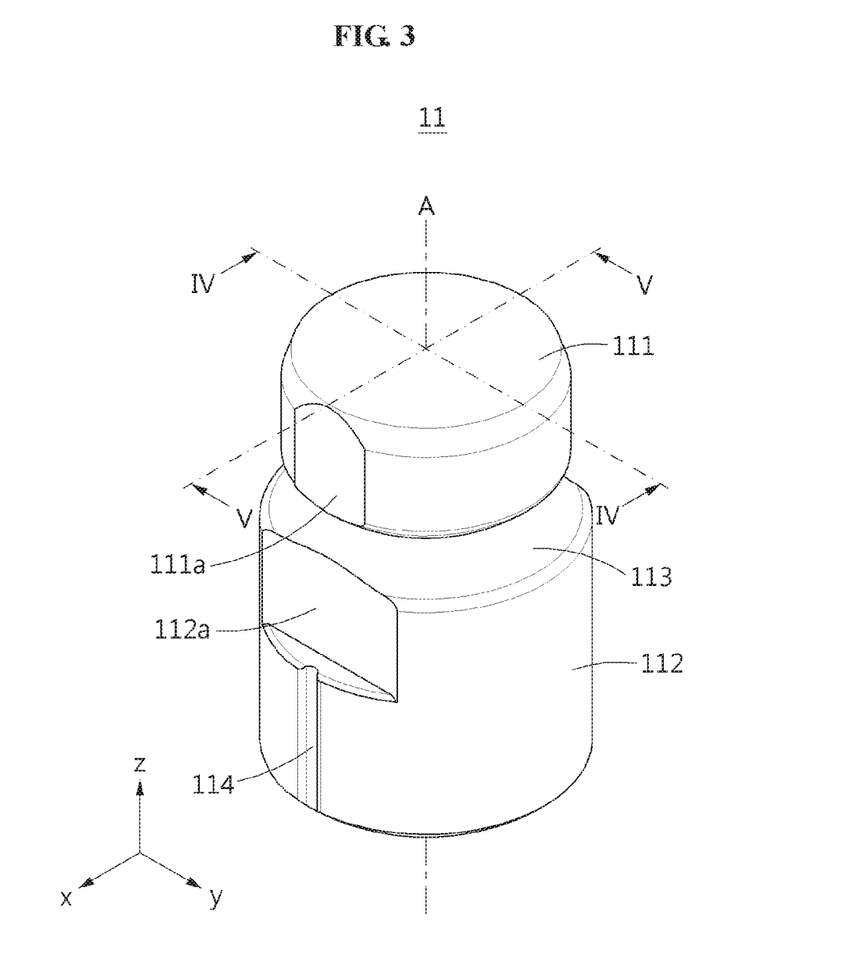
FIG. 3 is a perspective view of a snubber of the pressure sensor according to an embodiment.
Figure 4:
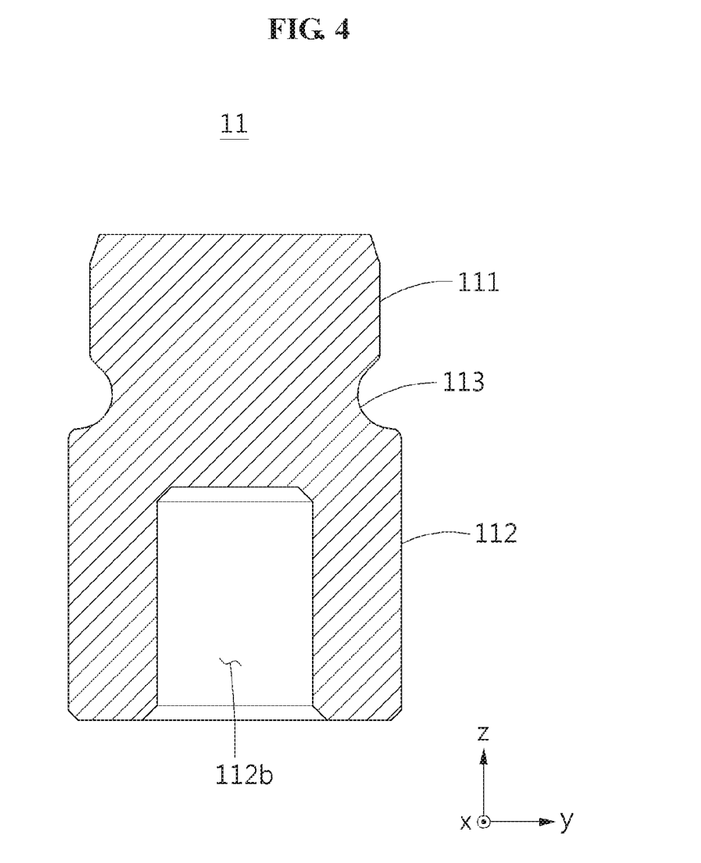
FIG. 4 is a sectional side view of the snubber taken along line Iv-Iv of FIG. 3.

The diaphragm 13, as shown in FIG. 3, may be provided in the sensor housing 10 and may be deformed by pressure of the fluid that flows into the sensor housing 10 from the pressure measurement target. In an embodiment, the diaphragm 13 may be safely placed on the support 12.

The circuit board 14, as shown in FIG. 3, may be in contact with the diaphragm 13, may convert the pressure applied to the diaphragm 13 to a signal form, and may transmit the same to an outside through the connector 15. The connector 15 may transmit a signal received from the circuit board 14 to the outside. The connector 15 may include a connector housing 151 configured to connect to the sensor housing 10 and an access terminal 152 provided in the connector housing 151 and configured to electrically connect to the circuit board 14.

The connecting terminal 16, as shown in FIG. 2, may be provided between the circuit board 14 and the access terminal 152 to electrically connect the circuit board 14 and the access terminal 152. The connecting terminal 16 may have elasticity in a direction perpendicular to the circuit board 14 to safely secure an electrical contact state between the circuit board 14 and the access terminal 152.

As shown in FIG. 2, the inner O-ring 17 may be provided between the connector housing 151 and the sensor housing 10, and may maintain tightness between the connector housing 151 and the sensor housing 10, preventing inflow of foreign substances. In an embodiment, the inner O-ring 17 may be provided along an outer circumference of the connector housing 151 and an inner edge of an inlet of the sensor housing 10. The outer O-ring 18 may be provided along an outer circumference of the sensor housing 10. The outer O-ring 18 enables tightness between the pressure measurement target and the sensor housing 10 to be maintained, preventing the inflow of foreign substances.

As shown in FIGS. 3-9, the snubber 11 may reduce an area of an internal flow path of the pressure sensor 1 to be narrow by mostly closing an area of an internal flow path of the sensor housing 10, that is, an area of the housing passage 102, leaving only a narrow flow path. The snubber 11 may include a snubber head 111, a snubber body 112, a fastening groove 113, and a fluid guide 114. Each of components of the snubber 11 may be fastened inside the sensor housing 10 using an easy and simple method, and may be structurally stably coupled therewith, and may be in a shape capable of securing a narrow flow path.

The snubber head 111, shown in FIGS. 3-9, may be inserted into the housing passage 102. The snubber head 111 may have a shape corresponding to a shape of the housing passage 102; in an embodiment in which the housing passage 102 has a cylindrical shape, the snubber head 111 has an approximately cylindrical shape. A diameter of the snubber head 111 may be less than or equal to a diameter of the inner passage 102b of the housing passage 102. The snubber head 111 may have the same diameter as that of the inner passage 102b and may insert into the sensor housing 10 in a surface contact state with the inner passage 102b. The diameter of the snubber head 111 indicates a diameter of a cylindrical portion in which a head separation region 111a is not provided.

Figure 5:
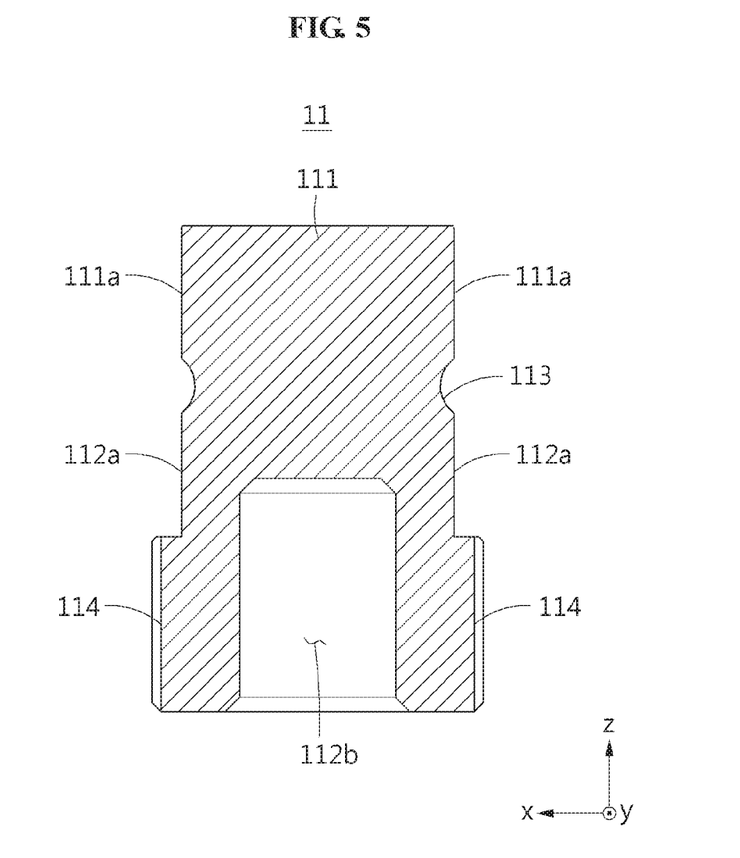
FIG. 5 is a sectional side view of the snubber taken along line V-V of FIG. 3.
Figure 9:
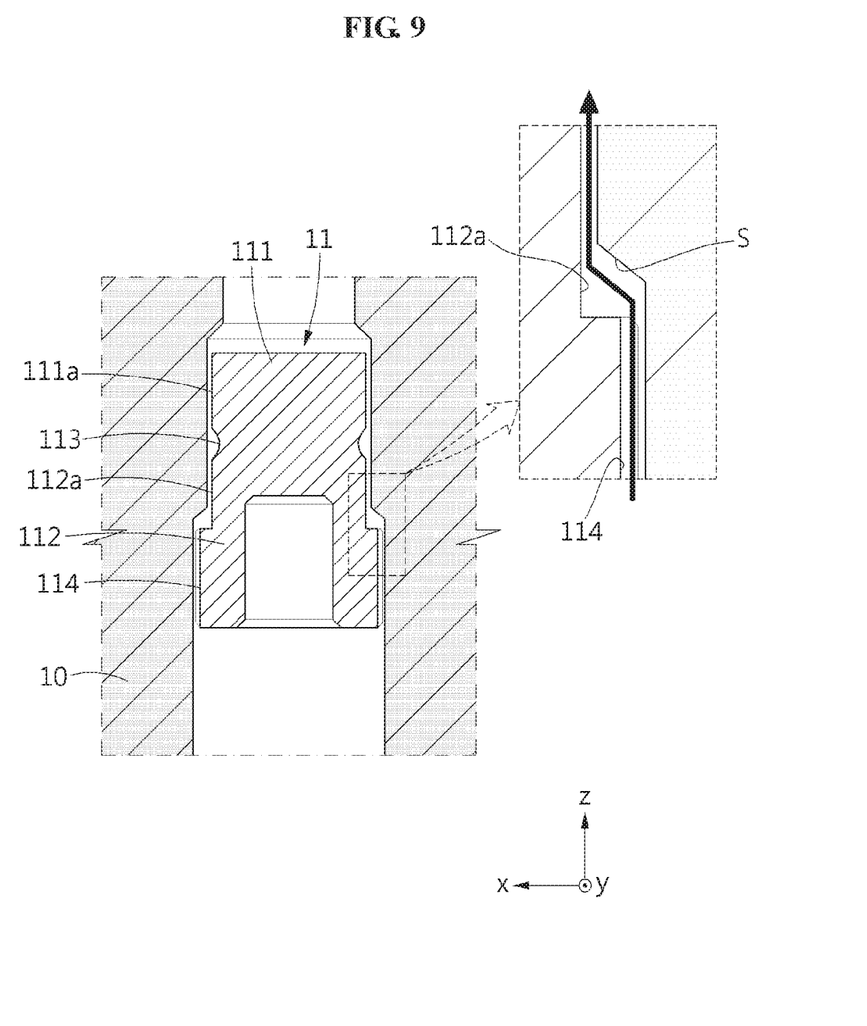
FIG. 9 is a sectional side view of the pressure sensor with the snubber inserted into the sensor housing in a fully fastened state and taken along a different plane than FIG. 8.

The snubber head 111 may include the head separation region 111a, shown in FIGS. 3, 5, and 9, having a cut shape in a direction parallel to a center shaft A of the snubber 11 on a side of the snubber head 111. The snubber head 111 may be separate from the sensor housing 10 in a portion in which the head separation region 111a is provided. The head separation region 111a may communicate an upper space and a lower space of the snubber head 111 if fluid may not readily pass since the diameter of the snubber head 111 is equal to the diameter of the inner passage 102b or a gap is too small. The fluid that arrives at a lower side portion of the snubber head 111 may move toward the upper space of the snubber head 111 through a space between the head separation region 111a of the snubber head 111 and the sensor housing 10. The head separation region 111a may be in a planar shape. In an embodiment, the head separation region 111a may be formed through a cutting process or a punching process. In another embodiment, the snubber head 111 may be manufactured such that the head separation region 111a may be formed through an injection molding process. A shape and a forming process of the head separation region 111a may vary from these examples in other embodiments.

The snubber body 112, shown in FIGS. 3-9, is provided at a rear with respect to the snubber head 111 based on a direction in which the snubber 11 inserts into the housing passage 102, and may deform the sensor housing 10 during insertion into the housing passage 102. The snubber body 112 may be in a shape corresponding to a shape of the housing passage 102. A diameter of the snubber body 112 may be greater than the diameter of the inner passage 102b of the housing passage 102 and may be less than or equal to the diameter of the outer passage 102a. Due to such a shape, the snubber body 112 may be inserted into the outer passage 102a without resistance and may be stopped by the step S provided between the outer passage 102a and the inner passage 102b. An operator may press the snubber 11 in the insertion direction and the snubber body 112 may be further inserted while deforming a portion of the step S. Here, the diameter of the snubber body 112 indicates a diameter of a cylindrical portion in which a body separation region 112a is not provided.

The snubber body 112, as shown in FIGS. 3-9, may include the body separation region 112a having a cut shape in a direction parallel to the center shaft A of the snubber 11 on a side of the snubber body 112 and a tool groove 112b recessed from a bottom surface of the snubber body 112. The snubber body 112 may be separate from the sensor housing 10 in a portion in which the body separation region 112a is provided. The snubber body 112 may deform the sensor housing 10 only in a portion in which the body separation region 112a is not provided. In an embodiment, the body separation region 112a may be in a planar shape. In an embodiment, the body separation region 112a may be formed through a cutting process or a punching process. In another embodiment, the snubber body 112 may be manufactured such that the body separation region 112a may be formed through an injection molding process. A shape and a forming process of the body separation region 112a may vary from these examples in other embodiments.

The snubber 11 may be manufactured using a metal injection molding (MIM) process. The tool groove 112b formed in the snubber body 112 may assist contraction to uniformly occur during a process of heating metal powders at a high temperature and then cooling the heated metal powders, that is, an expansion-and-contraction in the MIM process. Once manufacturing of the snubber 11 is completed, the tool groove 112b may function as a groove that receives a tool for a press-in process. The tool may insert into the tool groove 112b and may assist the snubber body 112 to stably deform the step S provided between the outer passage 102a and the inner passage 102b. The fastening groove 113 may be recessed between the snubber head 111 and the snubber body 112 and may receive a portion of the sensor housing 10 deformed by the snubber body 112. At least a portion of the fastening groove 113 may be separate from the sensor housing 10. A portion of the fastening groove 113 adjacent to the head separation region 111a may be separate from the sensor housing 10.

A process of fastening the snubber 11 will now be described in greater detail primarily with reference to FIGS. 6-9.

As shown in FIG. 6, the snubber 11 is inserted into the sensor housing 10 along the outer passage 102a. Because an area of the snubber body 112 that is a portion having a largest cross-sectional area in a direction perpendicular to the center shaft A of the snubber 11 is less than an area of the outer passage 102a, the snubber 11 does not interfere with the sensor housing 10 during insertion along the outer passage 102a. The snubber 11 may reach the step S provided between the outer passage 102a and the inner passage 102b. Since the diameter of the snubber body 112 is greater than the diameter of the inner passage 102b, the snubber body 112 may be stopped by the step S provided between the outer passage 102a and the inner passage 102b. Since the diameter of the snubber head 111 is less than the diameter of the inner passage 102b, the snubber head 111 is not stopped by the step S. The body separation region 112a of the snubber body 112 is not stopped by the step S.

Figure 7:
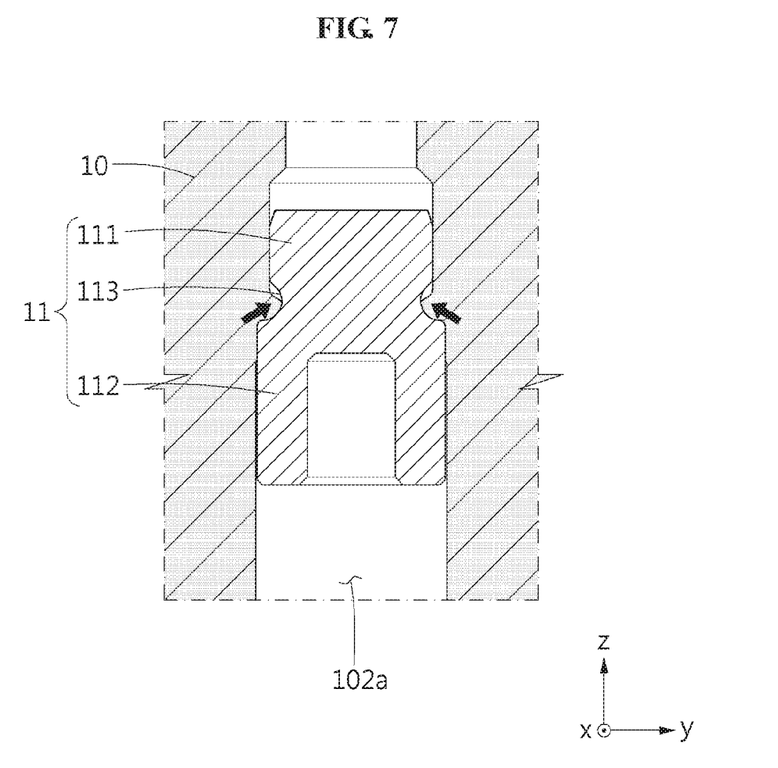
FIG. 7 is a sectional side view of the pressure sensor with the snubber inserted into the sensor housing in an intermediate stage.

Accordingly, as shown in FIG. 7, the snubber body 112 deforms the step S only in a portion in which the body separation region 112a is not provided, without deforming the step S in a portion in which the body separation region 112a is provided. During the press-in process, the portion deformed by the snubber body 112, that is, a portion of the sensor housing 10 that forms the housing passage 102 is deformed and metal flow that moves to an inside of the fastening groove 113 occurs. The fastening groove 113 receives the metal flow. In this manner, the snubber 11 may be fastened inside the sensor housing 10 without using a separate fastening member for supporting a lower end.

The fluid guide 114, shown in FIGS. 3, 5, and 9, may communicate between the upper space and the lower space of the snubber 11. In an embodiment, the fluid guide 114 may be recessed on the side of the snubber body 112. In an embodiment, the fluid guide 114 may be in a planar shape. The fluid guide 114 may guide the fluid that enters the lower space of the snubber 11 to the upper space of the snubber 11. In an embodiment, the fluid guide 114 may be formed in a direction parallel to the center shaft A of the snubber 11 and may be in an elongated shape recessed from an outer surface of the snubber body 112 toward the center shaft A. In other embodiments, a shape of the fluid guide 114 may vary from these examples. In an embodiment, the fluid guide 114 has a planar shape, which is similar to the head separation region 111a and the body separation region 112a. A plurality of fluid guides 114 may be provided at a desired interval along the circumference of the snubber body 112. For example, a single pair of fluid guides 114 may be provided to face each other based on the center shaft A of the snubber 11.

Figure 8:
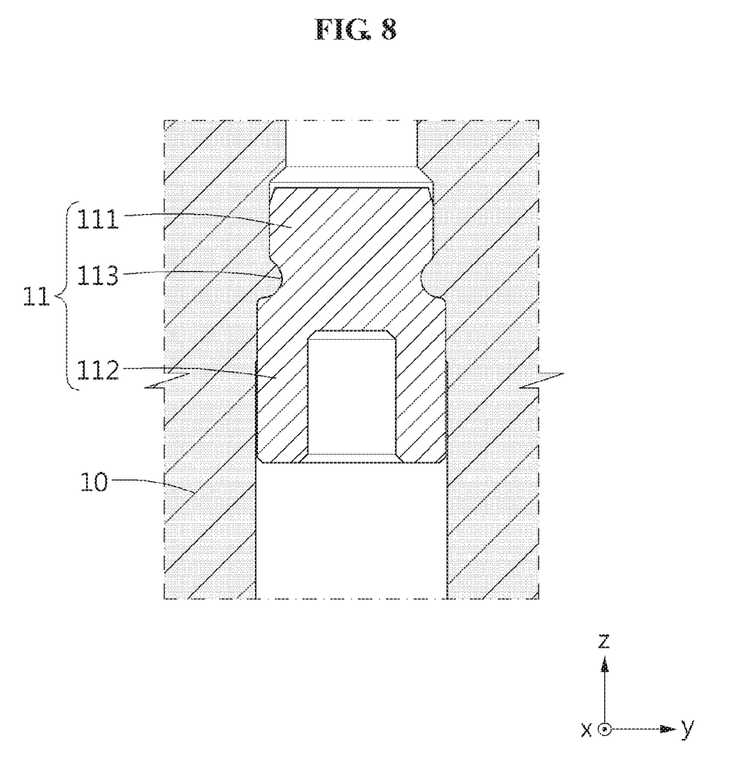
FIG. 8 is a sectional side view of the pressure sensor with the snubber inserted into the sensor housing in a fully fastened state.

As shown in FIGS. 8 and 9, a portion of the snubber body 112 in which the fluid guide 114 is not formed may be in contact with the sensor housing 10 that forms the housing passage 102. That is, the fluid may flow between the upper space and the lower space only through the fluid guide 114. The fluid guide 114 needs to have a relatively slow floating area to reduce impact applied to the diaphragm 13. Although the fluid guide 114 has the relatively narrow floating area, the snubber body 112 may secure a flow path without deforming the step S in a portion adjacent to the fluid guide 114 since the snubber body 112 includes the body separation region 112a. The snubber 11 functions to reduce the impact that is applied to the diaphragm 13; the fluid guide 114 needs to have a relatively small diameter such that the snubber 11 performs the function. If the body separation region 112a is absent, an area of the fluid guide 114 needs to be expanded to prevent a phenomenon that the fluid guide 114 is closed by metal flow. If the area of the fluid guide 114 is excessively expanded, the snubber 11 may not perform an original function. That is, the snubber 11 may not effectively prevent the impact that is applied to the diaphragm 13. However, if the body separation region 112a is provided, the fluid guide 114 may be formed to have a relatively small area and the snubber 11 may accomplish the original purpose.

The head separation region 111a and the body separation region 112a, shown in FIGS. 3, 5, and 9, may be provided in a line based on a direction in which the snubber 11 is inserted into the housing passage 102. That is, the head separation region 111a and the body separation region 112a may be arranged on a common virtual plane parallel to the center shaft A of the snubber 11. Through this shape, the head separation region 111a and the body separation region 112*a* may be easily manufactured through a one-time cutting process. Also, a separation space between the head separation region 111*a* and the sensor housing 10 and a separation space between the body separation region 112*a* and the sensor housing 10 may be formed in a line, thereby minimizing generation of vortex.

The fluid that flows into the sensor housing 10 from the pressure measurement target in a state in which the snubber 11 is fully fastened, as shown in FIGS. 8 and 9, may sequentially pass through a space between the fluid guide 114 and the sensor housing 10, a space between the body separation region 112*a* and the sensor housing 10, and a space between the head separation region 111*a* and the sensor housing 10 and may flow into the upper space of the snubber 11.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pressure sensor comprising:
   a sensor housing including a coupler configured to couple with a pressure measurement target and a housing passage configured to pass through the coupler and to guide a fluid that flows into the sensor housing from the pressure measurement target;
   a diaphragm provided in the sensor housing and configured to be deformable by a pressure of the fluid that flows into the sensor housing from the pressure measurement target, the housing passage having an outer passage formed to penetrate from a bottom surface of the coupler, an inner passage provided to be closer to the diaphragm than the outer passage and having a diameter less than a diameter of the outer passage, and a step formed between the outer passage and the inner passage; and
   a snubber configured to be inserted into the sensor housing through the housing passage and to fasten to the sensor housing in a state in which the step is deformed, the snubber guiding flow of the fluid and transmitting the pressure of the fluid to the diaphragm.

2. The pressure sensor of claim 1, wherein the snubber has a snubber head, a snubber body positioned opposite the snubber head in a direction in which the snubber is inserted into the housing passage, and a fastening groove recessed between the snubber head and the snubber body.

3. The pressure sensor of claim 2, wherein the snubber body is configured to deform the sensor housing during insertion into the housing passage and the fastening groove is configured to receive a portion of the sensor housing deformed by the snubber body.

4. The pressure sensor of claim 3, wherein the snubber has a fluid guide provided along a longitudinal direction of the snubber and configured to communicate between a lower space and an upper space of the snubber.

5. The pressure sensor of claim 4, wherein the fluid guide is formed on a side of the snubber body.

6. The pressure sensor of claim 5, wherein the snubber body has a body separation region provided between the fluid guide and the snubber head, the body separation region is configured to insert into the sensor housing along the inner passage and separate the snubber body from the sensor housing.

7. The pressure sensor of claim 6, wherein the snubber body is configured to not deform the step in a portion in which the body separation region is provided.

8. The pressure sensor of claim 6, wherein the snubber head has a head separation region provided on a side of the snubber head and configured to insert into the sensor housing along the inner passage and separate the snubber head from the sensor housing.

9. The pressure sensor of claim 8, wherein the body separation region and the head separation region are provided in a line in the direction in which the snubber is inserted into the housing passage.

10. The pressure sensor of claim 9, wherein each of the body separation region and the head separation region is in a planar shape.

11. The pressure sensor of claim 4, wherein a plurality of fluid guides is provided at an interval along a circumference of the snubber body.

12. A snubber configured to fasten to a sensor housing, comprising:
    a snubber head configured to be inserted into the sensor housing, the sensor housing having an outer passage and an inner passage configured to extend from the outer passage, the inner passage having a diameter less than a diameter of the outer passage;
    a snubber body provided opposite the snubber head in a direction in which the snubber is inserted into the inner passage and configured to insert into the sensor housing while deforming a step formed between the outer passage and the inner passage;
    a fastening groove recessed between the snubber head and the snubber body and configured to receive at least a portion of the sensor housing deformed by the snubber body; and
    a fluid guide provided along a longitudinal direction of the snubber and configured to communicate between an upper space and a lower space of the snubber.

13. The snubber of claim 11, wherein the fluid guide is formed on a side of the snubber.

14. The snubber of claim 12, wherein the snubber body has a body separation region provided between the fluid guide and the snubber head, the body separation region is configured to insert into the sensor housing along the inner passage and separate the snubber body from the sensor housing.

15. The snubber of claim 14, wherein the snubber head has a head separation region provided on a side of the snubber head and configured to insert into the sensor housing along the inner passage and separate the snubber head from the sensor housing.

* * * * *